United States Patent
Kawasaki

(10) Patent No.: US 10,302,748 B2
(45) Date of Patent: May 28, 2019

(54) SENSOR CIRCUIT AND SENSOR APPARATUS

(71) Applicant: Yuya Kawasaki, Tokyo (JP)

(72) Inventor: Yuya Kawasaki, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 142 days.

(21) Appl. No.: 15/685,115

(22) Filed: Aug. 24, 2017

(65) Prior Publication Data

US 2018/0088218 A1 Mar. 29, 2018

(30) Foreign Application Priority Data

Sep. 29, 2016 (JP) ................. 2016-192189

(51) Int. Cl.
*G01S 17/08* (2006.01)
*G01S 7/491* (2006.01)
*G01S 17/02* (2006.01)

(52) U.S. Cl.
CPC .......... *G01S 7/4913* (2013.01); *G01S 17/026* (2013.01); *G01S 17/08* (2013.01)

(58) Field of Classification Search
CPC ....... G01S 7/4913; G01S 17/026; G01S 17/08
See application file for complete search history.

(56) References Cited

U.S. PATENT DOCUMENTS

2012/0286162 A1* 11/2012 Uedaira ............... G01S 17/026
250/338.4
2018/0088218 A1* 3/2018 Kawasaki ............ G01S 17/026

FOREIGN PATENT DOCUMENTS

JP 2011-209236 10/2011

* cited by examiner

*Primary Examiner* — Tony Ko
(74) *Attorney, Agent, or Firm* — IPUSA, PLLC

(57) ABSTRACT

A sensor circuit includes an illuminance sensor to detect illuminance of ambient light; and a proximity sensor to drive a light emitter, and to detect proximity of an object, based on an intensity of light emitted by the emitter and reflected on the object. The sensor circuit further includes at least one terminal among: a drive terminal for driving the light emitter; a detection result output terminal used for outputting a detection result of one of the sensors; an input/output terminal used for inputting and outputting data compliant with a communication protocol; and a clock terminal used for inputting a clock signal compliant with the communication protocol, and a writable nonvolatile memory in which trimming data for correcting an individual variation of a characteristic of the sensor circuit is to be written. The trimming data input from at least one of the terminal is written in the memory.

3 Claims, 4 Drawing Sheets

FIG.2

| CELL NUMBER | CONTENT |
|---|---|
| Cell_1 | CELL FOR ALS SENSITIVITY ADJUSTMENT |
| Cell_2 | |
| Cell_3 | |
| Cell_4 | |
| Cell_5 | CELL FOR PS SENSITIVITY ADJUSTMENT |
| Cell_6 | |
| Cell_7 | |
| Cell_8 | |
| Cell_9 | CELL FOR NVM WRITE PROTECTION |

FIG.3

| TERMINAL NUMBER | TERMINAL NAME | | FUNCTION (DURING TRIMMING MODE) |
|---|---|---|---|
| | DURING NORMAL OPERATION | DURING TRIMMING MODE | |
| 1 | VDD | VDDP | POWER TERMINAL FOR PROGRAMMING |
| 2 | SCL | (Floating) | — |
| 3 | GND | GND | GROUND TERMINAL |
| 4 | IRDR | PULSE | PULSE APPLICATION TERMINAL FOR PROGRAMMING |
| 5 | INT | CLOCK | CLOCK APPLICATION TERMINAL FOR PROGRAMMING |
| 6 | SDA | RESET | RESET APPLICATION TERMINAL FOR PROGRAMMING |

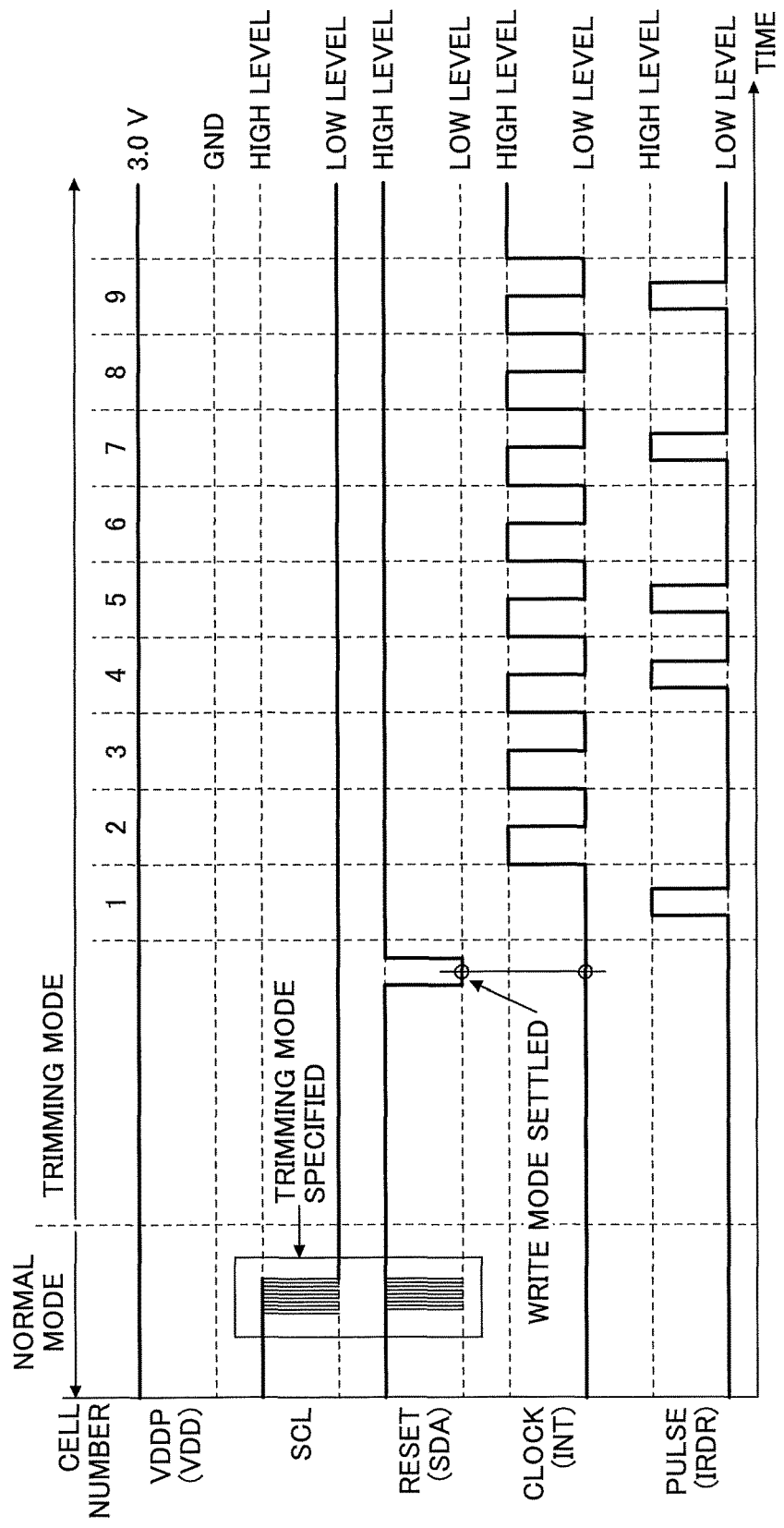

SENSOR CIRCUIT AND SENSOR APPARATUS

CROSS-REFERENCE TO RELATED APPLICATIONS

This patent application is based upon and claims the benefit of Japanese Priority Application No. 2016-192189, filed on Sep. 29, 2016, with the Japanese Patent Office, the entire contents of which are hereby incorporated by reference.

BACKGROUND OF THE INVENTION

1. Field of the Invention

The present disclosure relates to a sensor circuit and a sensor apparatus.

2. Description of the Related Art

Conventionally, a sensor apparatus has been known that has a function as an illuminance sensor, and a function as a proximity sensor, to be capable of adjusting both variance of illuminance measurement and variance of proximity measurement, resulting from variation of manufactured products (see Patent document 1). This sensor apparatus includes a trimming signal input terminal and a trimming adjuster circuit. This trimming adjuster circuit adjusts the light sensitivity of a light detector circuit, and the amount of current that drives a light emitter drive circuit, based on a trimming signal input into a trimming signal input terminal from the outside of the sensor apparatus.

PRIOR ART DOCUMENTS

Patent Documents

[Patent document 1] Japanese Unexamined Patent Application Publication No. 2011-209236

SUMMARY OF THE INVENTION

However, such a trimming signal input terminal according to the conventional technology is a terminal dedicated for trimming, and is not used once the trimming has completed. This means that the chip area of a semiconductor integrated circuit is not used very efficiently.

Thereupon, an embodiment in the present disclosure has an object to provide a sensor circuit and a sensor apparatus which improves use efficiency of the chip area.

The Means for Solving the Problem

In order to achieve the object, according to an aspect of this disclosure, a sensor circuit includes an illuminance sensor configured to detect illuminance of ambient light; and a proximity sensor configured to drive a light emitter, and to detect proximity of an object, based on an intensity of reflected light coming from the object on which light emitted from the light emitter is reflected. The sensor circuit further includes at least one terminal among: a drive terminal used for outputting a signal to drive the light emitter; a detection result output terminal used for outputting a detection result of at least one of the illuminance sensor and the proximity sensor; an input/output terminal used for inputting and outputting data compliant with a predetermined communication protocol; and a clock terminal used for inputting a clock signal compliant with the predetermined communication protocol, and a writable nonvolatile memory in which trimming data for correcting an individual variation of a characteristic of the sensor circuit is to be written. The trimming data input from at least the one terminal is written in the nonvolatile memory.

According to such an aspect of the present disclosure, since a terminal dedicated for inputting the trimming data becomes unnecessary, and hence, it is possible to improve use efficiency of the chip area.

BRIEF DESCRIPTION OF THE DRAWINGS

FIG. 2 is a diagram illustrating an example of a cell configuration of a nonvolatile memory in which trimming data is written;

FIG. 3 is a diagram illustrating an example of functions of terminals during a trimming mode of a sensor circuit;

FIG. 4 is a timing chart illustrating an example observed when transitioning from the normal mode to the trimming mode;

DETAILED DESCRIPTION OF THE PREFERRED EMBODIMENTS

In the following, embodiments in the present disclosure will be described with reference to the drawings.

Figure 1:
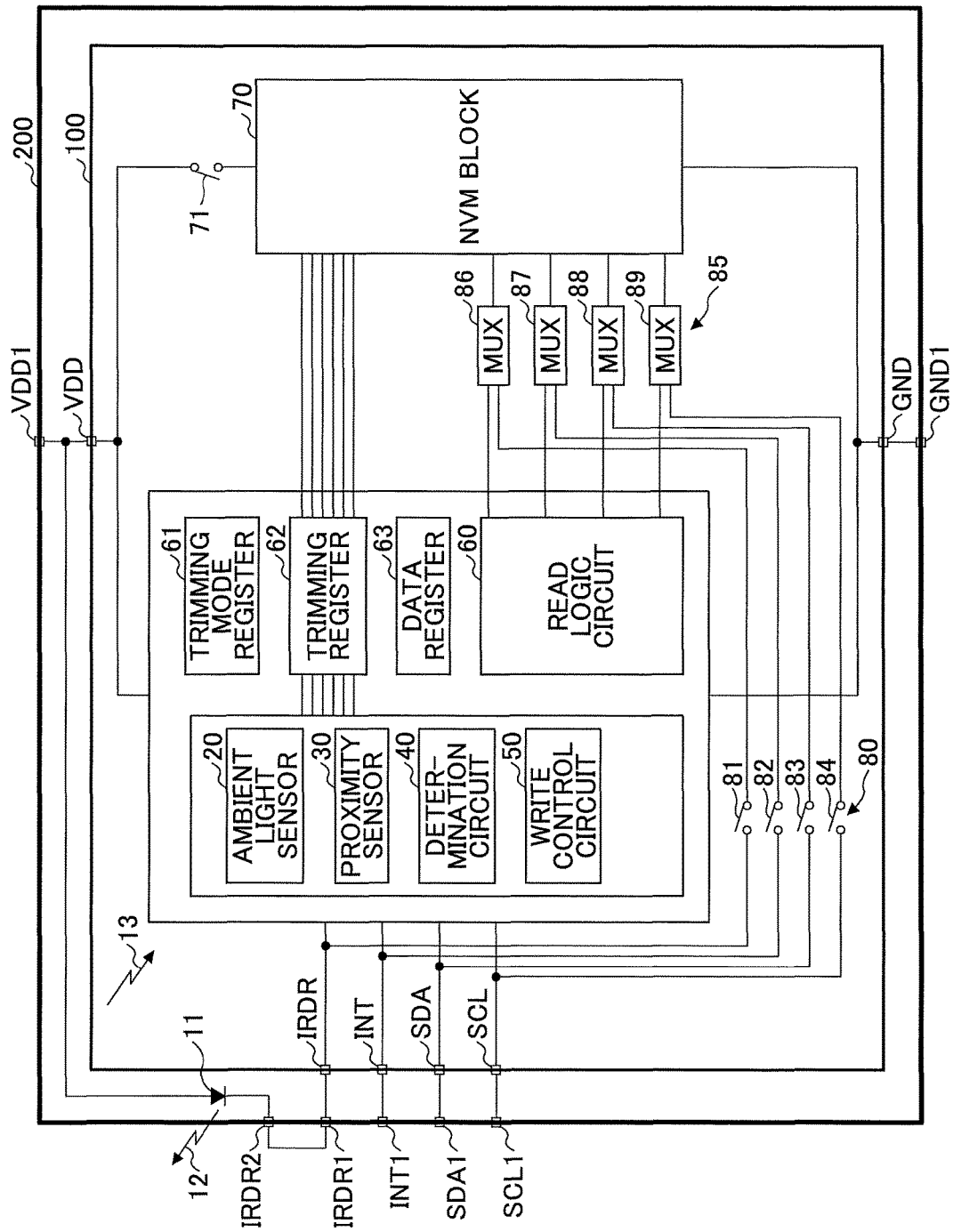
FIG. 1 is a diagram illustrating an example of a configuration of a sensor apparatus.

FIG. 1 is a diagram illustrating an example of a configuration of a sensor apparatus 200. The sensor apparatus 200 is an example of a sensor apparatus that is capable of sensing both proximity of an object and illuminance of ambient light. The sensor apparatus 200 includes a light emitter 11 and a sensor circuit 100. The sensor apparatus 200 is a module product that packages the light emitter 11 and the sensor circuit 100, for example, in a covering part such as resin. The sensor apparatus 200 is installed in a portable information device, for example, a smart phone.

The sensor circuit 100 is an example of a sensor circuit that is capable of sensing both proximity of an object and illuminance of ambient light. The sensor circuit 100 is, for example, a semiconductor integrated circuit formed on a chip. As a specific example of the sensor circuit 100, a bare chip that is not packaged may be cited.

The sensor circuit 100 includes an illuminance sensor 20, a proximity sensor 30, a data register 63, and a determination circuit 40. Note that in the following description, the illuminance sensor (when used as an ambient light sensor) may be abbreviated as "ALS", and the proximity sensor may be abbreviated "PS".

The illuminance sensor 20 has a photodetector for ALS that has sensitivity in the visible light, to sense ambient light coming from the surroundings of the illuminance sensor 20. The illuminance sensor 20 detects the illuminance of the ambient light sensed by the photodetector for ALS, and applies A/D (Analog-to-Digital) conversion to analog data corresponding to the detected illuminance. Then, the illuminance sensor 20 outputs digital data of the detected illuminance to which the A/D conversion has been applied. The digital detected illuminance data is stored in the data register 63 for ALS.

For example, if the detected illuminance data stored in the data register 63 for ALS is detected as having a higher value than a predetermined high-level threshold, the determination circuit 40 changes the level of a detection result output terminal INT into an active level (for example, low level). Also, for example, if the detected illuminance data stored in the data register 63 for ALS is detected as having a lower value than a predetermined low-level threshold, the determination circuit 40 changes the level of the detection result output terminal INT into an active level (for example, low level). If a predetermined reset condition is satisfied after having changed the level of the detection result output terminal INT into the active level, the determination circuit 40 changes the level of the detection result output terminal INT into a non-active level (for example, high level).

The proximity sensor 30 drives the light emitter 11 so that a light emission pulse 12 is emitted from the light emitter 11, and makes a photodetector for PS sense reflected light 13 coming from an object on which the light emission pulse 12 emitted from the light emitter 11 is reflected. Then, the proximity sensor 30 detects the light intensity of the reflected light 13 sensed by the photodetector for PS, and applies A/D conversion to analog data corresponding to the detected light intensity. Then, the proximity sensor 30 outputs digital data of the detected light intensity to which the A/D conversion has been applied. The digital detected light intensity data is stored in the data register 63 for PS.

For example, if the digital detected light intensity data stored in the data register 63 for PS is detected as having a higher value than a predetermined high-level threshold, the determination circuit 40 changes the level of the detection result output terminal INT into an active level (for example, low level). Also, for example, the digital detected light intensity data stored in the data register 63 for PS is detected as having a lower value than a predetermined low-level threshold, the determination circuit 40 changes the level of the detection result output terminal INT into an active level (for example, low level). If a predetermined reset condition is satisfied after having changed the level of the detection result output terminal INT into the active level, the determination circuit 40 changes the level of the detection result output terminal INT into a non-active level (for example, high level).

In this way, the proximity sensor 30 detects proximity of the object, based on the light intensity of the reflected light 13 sensed by the photodetector for PS. Objects detected by the proximity sensor 30 in the proximity include the entirety and portions (for example, hand, finger, and face) of a human body.

As a specific example of the light emitter 11, a light-emitting diode may be cited. The light emitter 11 outputs, for example, an infrared light emission pulse 12. Although FIG. 1 illustrates a form in which the light emitter 11 is externally connected to the sensor circuit 100 in the sensor apparatus 200, the light emitter 11 may be built in the proximity sensor 30. FIG. 1 also illustrates a form in which the cathode of the light-emitting diode is connected to the proximity sensor 30, and the proximity sensor 30 takes in the current for driving from the light-emitting diode. However, it is possible to consider a form in which the anode of the light-emitting diode is connected to the proximity sensor 30, and the proximity sensor 30 supplies the current for driving the light-emitting diode.

As a specific example of the photodetector for ALS or the photodetector for PS, a photodiode may be cited. The photodetector may be shared between the illuminance sensor 20 and the proximity sensor 30.

The sensor circuit 100 includes a writable NVM (non-volatile memory) block 70 in which trimming data for correcting the individual variation of a characteristic of the sensor circuit 100 or the sensor apparatus 200, is to be written. The NVM block 70 is, for example, a one-time programmable nonvolatile memory; data once written in the memory cannot be erased. The sensor circuit 100 in a wafer shipment state is adjustable with respect to the illuminance detection sensitivity of the illuminance sensor 20, and the light intensity detection sensitivity of the proximity sensor 30, as will be described in detail later.

Access to the NVM block 70 is enabled by specifying a trimming mode register 61 in a pointer address. The trimming mode register 61 is a register to specify the trimming mode for executing writing of trimming data in the NVM block 70. The write control circuit 50 switches from a normal mode to the trimming mode at a timing when the trimming mode register 61 is accessed (at a time when the address of the trimming mode register 61 is written in the pointer register). The trimming data is input from one or more predetermined terminals, to execute trimming. The trimming data written in the NVM block 70 is automatically read by a read logic circuit 60 when the power of the sensor circuit 100 is turned on, to be stored in the trimming register 62.

FIG. 2 is a diagram illustrating an example of a cell configuration of the nonvolatile memory in which trimming data is written. FIG. 2 illustrates an example of a cell configuration of the NVM block 70. The NVM block 70 has multiple cells (for example, nine cells), to which functions of ALS sensitivity adjustment, PS sensitivity adjustment, and write protection are assigned. In the case of FIG. 2, trimming data for adjusting individual difference variation of the illuminance detection sensitivity of the illuminance sensor 20 is written in the cells having the cell numbers 1-4. The trimming data for adjusting individual difference variation of the light intensity detection sensitivity of the proximity sensor 30 is written in the cells having the cell numbers 5-8. In order to prevent erroneous writing in the NVM block 70 by a user after the product shipment, a write-protection bit is written in the cell having the cell number 9 for disabling transition to the trimming mode.

FIG. 3 is a diagram illustrating an example of functions of terminals during the trimming mode of the sensor circuit. The sensor circuit 100 includes six terminals. A power terminal VDD is a terminal to which the positive electrode of a power supply is connected, and a grand terminal GND is a terminal to which the negative electrode of the power supply is connected. A drive terminal IRDR is used for outputting a signal by which the proximity sensor 30 drives the light emitter 11 during a normal operation. The detection result output terminal INT is used for outputting a detection result of at least one of the illuminance sensor 20 and the proximity sensor 30 during a normal operation. An input/output terminal SDA is used for inputting and outputting data compliant with a predetermined communication protocol during a normal operation. A clock terminal SCL is used for inputting a clock signal compliant with the predetermined communication protocol during a normal operation. As a specific example of the predetermined communication protocol, I2C or the like may be cited. Note that "during a normal operation" is synonymous with "during the normal mode".

The write control circuit 50 switches from the normal mode to the trimming mode at a timing when the trimming mode register 61 is accessed (at a time when the address of the trimming mode register 61 is written in the pointer register). The power terminal VDD is used as a power terminal VDDP for programming during the trimming mode. The clock terminal SCL is a floating terminal during the trimming mode. The drive terminal IRDR is used as a pulse application terminal for programming during the trimming mode. The detection result output terminal INT is used as a clock application terminal for programming. The input/output terminal SDA is used as a reset application terminal for programming. Note that "for programming" is synonymous with "for writing."

In FIG. 1, the write control circuit 50 in the normal mode connects the NVM block 70 to a predetermined terminal, based on the clock signal input from the clock terminal SCL, and a predetermined command signal to transition to writing, which is input from the input/output terminal SDA. For example, the write control circuit 50 controls a switch circuit 80 and a multiplexer circuit 85, to connect the NVM block 70 to one or more terminals determined in advance as the input terminal of trimming data, among four terminals IRDR, INT, SDA, and SCL.

The switch circuit 80 includes switches 81-84. The switches 81-84 switch on and off of connections between the four terminals and the NVM blocks 70 for the respective terminals. The multiplexer circuit 85 includes four multiplexers (MUXes) 86-89. The MUXes 86-89 switch the connection destination of the NVM block 70 to either of the read logic circuit 60 and one of the four terminals, for the respective terminals.

FIG. 4 is a timing chart illustrating an example observed when transitioning from the normal mode to the trimming mode.

The write control circuit 50 in the normal mode turns on the switches 81-83 and turns off the switch 84, based on the clock signal input from the clock terminal SCL and the predetermined command signal to transition to writing, which is input from the input/output terminal SDA. Accordingly, it is possible to have the terminals IRDR, INT, and SDA connected to the NVM block 70, and to prevent the terminal SCL, which is not used in the trimming mode, from being connected to the NVM block 70.

During the trimming mode, if the terminal RESET (terminal SDA) transitions from the high level to the low level while the terminal CLOCK (terminal INT) is in a state of the low level, the write control circuit 50 selects the cell having the cell number 1 in the NVM block 70 as a writable cell. In a state after the terminal RESET has transitioned from the low level to the high level, the write control circuit 50 selects a cell having a next cell number in the NVM block 70 in ascending order as a writable cell at each rising edge of the terminal CLOCK. When a cell has been selected by the write control circuit 50, and the terminal PULSE (terminal IRDR) takes the high level, trimming data is written in the selected cell.

In FIG. 1, when reading the trimming data written in the NVM block 70 in response the power on, the read logic circuit 60 connects itself to the NVM block 70 by controlling the MUXes 86-89 of the multiplexer circuit 85. In a state connected to the NVM block 70, the read logic circuit 60 stores the trimming data in the trimming register 62. The illuminance detection sensitivity of the illuminance sensor 20 and the light intensity detection sensitivity of the proximity sensor 30 are adjusted depending on the trimming data stored in the trimming register 62.

Here, the NVM block 70 is active only when writing or reading is executed. Therefore, the write control circuit 50 turns off the switch 71 after a write completion. Alternatively, the read logic circuit 60 turns off the switch 71 after a read completion. Accordingly, the NVM block 70 becomes non-active and the power supply to the NVM block 70 is cut off. Therefore, it is possible to reduce the power consumption of the sensor circuit 100.

Also, according to this embodiment, in a wafer state (a state of the sensor circuit 100), the NVM block 70 can be written by using one of the terminals IRDR, INT, SDA, and SCL. Also, in the case where the external terminals of the sensor apparatus 200 and the terminals of the sensor circuit 100 are connected, it is possible to execute writing in the NVM block 70 from the external terminals even in a module state after the assembly (a state of the sensor apparatus 200). The sensor apparatus 200 includes the external terminals IRDR1, IRDR2, INTI, SDA1, SCL1, VDD1, and GND1. The external terminals of the sensor apparatus 200 are connected to the respective terminals of the sensor circuit 100 as illustrated in the figure. The external terminals of the sensor apparatus 200 are exposed without being covered by a covering part 201 (see FIG. 6) that covers the sensor circuit 100 and the light emitter 11.

Also, if the write-protection bit is written in the cell having the final cell number 9 (see FIG. 2), the write control circuit 50 can inhibit data writing via the terminals IRDR, INT, SDA, and SCL, by fixing the switch circuit 80 to be non-active.

Figure 5:
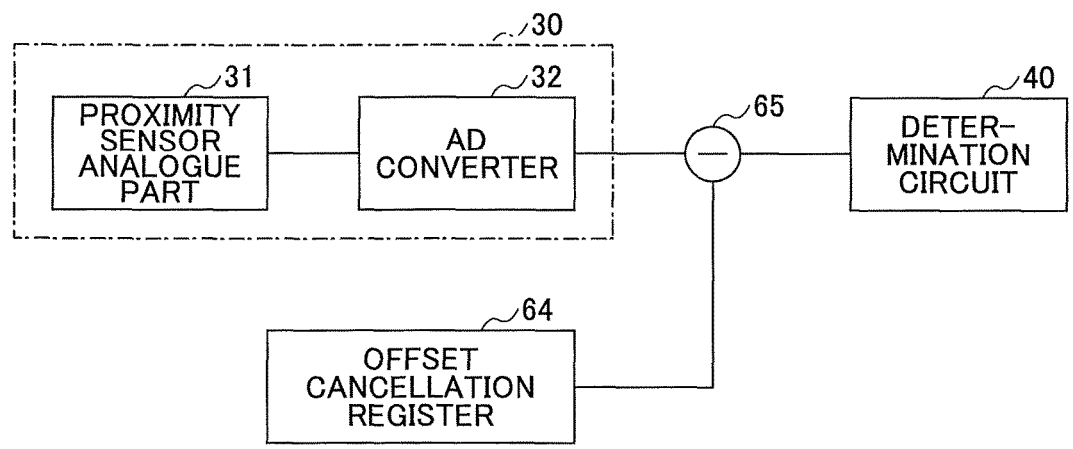
FIG. 5 is a diagram illustrating an example of a light intensity correction circuit to correct a light intensity detected by a proximity sensor.
Figure 6:
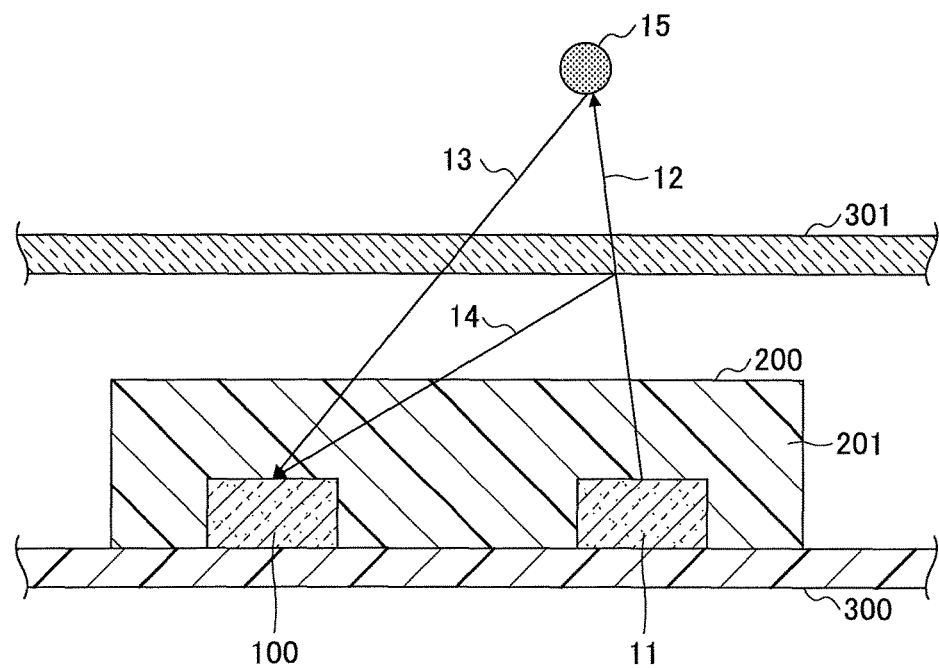
FIG. 6 is a diagram illustrating an example of a form where a sensor apparatus is installed in an electronic device that uses the sensor apparatus.

FIG. 5 is a diagram illustrating an example of a light intensity correction circuit that corrects the light intensity detected by the proximity sensor 30. FIG. 6 is a diagram illustrating an example of a form where a sensor apparatus is installed in an electronic device that uses the sensor apparatus.

In FIG. 6, the sensor apparatus 200 is mounted on a substrate 300 of the electronic device, and is covered by a cover glass 301 of the electronic device. A light emission pulse 12 emitted from the light emitter 11 transmits the cover glass 301, and is reflected by an object 15 outside of the cover glass 301, to be sensed as reflected light by the photodetector of the sensor circuit 100. In this case, the light emission pulse 12 emitted from the light emitter 11 may be reflected by the inner surface of the cover glass 301, and a phenomenon (called "optical cross talk") may occur in which the reflected light 14 is input into the photodetector. If such an optical cross talk occurs, a positive offset is loaded to the digital detected light intensity data after A/D conversion, which may reduce detection precision of the degree of proximity.

Therefore, the sensor circuit 100 includes a subtraction circuit 65 to add a negative offset to the digital detected light intensity data after A/D conversion. The subtraction circuit 65 subtracts data stored in an offset cancellation register 64 from the digital detected light intensity data after A/D conversion. Thus, the subtraction circuit 65 can add the negative offset to the digital detected light intensity data after A/D conversion even if an optical cross talk occurs, which increases the precision of the digital detected light intensity data after A/D conversion. In other words, the influence of an optical cross talk can be reduced.

Note that the proximity sensor analog part 31 includes, for example, a photodetector, a current-voltage converter circuit to convert a current output from the photodetector into a voltage, and an amplifier to amplify the output voltage of the current-voltage converter circuit. An A/D converter 32 converts analog data of detected light, which is output from the amplifier, into digital data of the detected light.

As above, a sensor circuit and a sensor apparatus have been described with the embodiments. Note that the present invention is not limited to the above embodiments. Various modifications and improvements can be made within the scope of the present invention, by combining and/or replacing a part of or all of the embodiments with the others.

For example, the photodetector may be any photoelectric device other than a photodiode, and may be, for example, a phototransistor.

Also, a product in which the sensor circuit or the sensor apparatus is installed may be any product other than a portable information device, and may be, for example, a vehicle or a household electrical appliance.

Also, an object to be sensed is not limited to a part of a human body such as a hand or a finger, and may be an auxiliary input operation tool such as an operation stick or a touch pen.

What is claimed is:

1. A sensor circuit, comprising:
   an illuminance sensor configured to detect illuminance of ambient light; and
   a proximity sensor configured to drive a light emitter, and to detect proximity of an object, based on an intensity of reflected light coming from the object on which light emitted from the light emitter is reflected,
   wherein the sensor circuit further includes at least one terminal among:
   a drive terminal used for outputting a signal to drive the light emitter,
   a detection result output terminal used for outputting a detection result of at least one of the illuminance sensor and the proximity sensor,
   an input/output terminal used for inputting and outputting data compliant with a predetermined communication protocol, and
   a clock terminal used for inputting a clock signal compliant with the predetermined communication protocol, and
   a writable nonvolatile memory in which trimming data for correcting an individual variation of a characteristic of the sensor circuit is to be written,
   wherein the trimming data input from at least the one terminal is written in the nonvolatile memory.

2. The sensor circuit as claimed in claim 1, further comprising:
   the input/output terminal; and
   a write control circuit configured to connect the nonvolatile memory to one or more terminals into which the trimming data is input, based on a predetermined command signal input from the input/output terminal.

3. A sensor apparatus, comprising:
   the sensor circuit as claimed in claim 1;
   a covering part configured to cover the sensor circuit; and
   one or more external terminals connected to at least the one terminal, and not covered by the covering part, to be exposed.

* * * * *